(12) United States Patent
Cadigan, Jr. et al.

(10) Patent No.: US 11,074,184 B2
(45) Date of Patent: Jul. 27, 2021

(54) MAINTAINING DATA ORDER BETWEEN BUFFERS

(71) Applicant: INTERNATIONAL BUSINESS MACHINES CORPORATION, Armonk, NY (US)

(72) Inventors: Michael Cadigan, Jr., Poughkeepsie, NY (US); Erez Barak, Hod Hasharon (IL); Deepankar Bhattacharjee, Bangalore (IN); Yair Fried, Petah Tiqwa (IL); Jonathan Hsieh, Poughkeepsie, NY (US); Martin Recktenwald, Schoenaich (DE); Aditya Nitin Puranik, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/383,705

(22) Filed: Apr. 15, 2019

(65) Prior Publication Data

US 2020/0327059 A1 Oct. 15, 2020

(51) Int. Cl.
*G06F 12/0815* (2016.01)

(52) U.S. Cl.
CPC .. *G06F 12/0815* (2013.01); *G06F 2212/1008* (2013.01); *G06F 2212/608* (2013.01)

(58) Field of Classification Search
CPC .......... G06F 12/0815; G06F 2212/1008; G06F 2212/608
See application file for complete search history.

(56) References Cited

U.S. PATENT DOCUMENTS

| 5,842,800 A | 12/1998 | Bailey et al. |
| 5,903,775 A * | 5/1999 | Murray ............... H04N 7/24 710/33 |
| RE40,904 E | 9/2009 | Garde |
| 9,055,011 B2 | 6/2015 | Li et al. |

(Continued)

OTHER PUBLICATIONS

Gilbert, Max et al. "Evaluation of Pointer Swizzling for Database Buffer Management", 29th GI-Workshop on Foundations of Databases (Grundlagen von Datenbanken), May 30, 2017-Jun. 2, 2017; Blankenburg/Harz, Germany; pp. 42-47.

(Continued)

*Primary Examiner* — Eric Cardwell
(74) *Attorney, Agent, or Firm* — Cantor Colburn LLP; William Kinnaman

(57) ABSTRACT

Methods, systems and computer program products for monitoring delivered packages are provided. Aspects include receiving, by a co-processor, a data stream and performing processing on the data stream. Aspects also include writing, by the co-processor, a data record into the output buffer. Based on a determination that the data record should replace a most recently stored data record in a cache, aspects include providing, by the co-processor to the cache controller, an instruction for the cache controller to write the data record to a location in the cache obtained from a most recently used address register. Based on a determination that the data record should not replace the most recently stored data record in the cache, aspects include writing, by the cache controller, the data record to an available location in the cache.

17 Claims, 3 Drawing Sheets

(56) References Cited

U.S. PATENT DOCUMENTS

| | | | |
|---|---|---|---|
| 9,229,724 B2 | 1/2016 | Brooker et al. | |
| 9,591,582 B1 * | 3/2017 | Rabii | H04L 43/028 |
| 10,001,993 B2 | 6/2018 | Barry et al. | |
| 10,129,027 B1 | 11/2018 | Juels et al. | |
| 10,182,022 B2 | 1/2019 | Krinsky | |
| 10,210,089 B2 | 2/2019 | Herrmann et al. | |
| 2009/0319550 A1 * | 12/2009 | Shau | G06F 16/284 |
| 2011/0016292 A1 | 1/2011 | McDonald et al. | |
| 2011/0295862 A1 * | 12/2011 | Taylor | G06F 7/24 |
| | | | 707/752 |
| 2014/0185390 A1 | 7/2014 | Mangano et al. | |
| 2015/0046478 A1 * | 2/2015 | Asaad | G06F 16/2246 |
| | | | 707/753 |
| 2017/0010967 A1 | 1/2017 | Venkatasubramanian et al. | |
| 2018/0292991 A1 | 10/2018 | Walker | |

OTHER PUBLICATIONS

Kroes, Taddeus et al. "Delta Pointers: Buffer Overflow Checks Without the Checks", EuroSys '18, Apr. 23-26, 2018, Polio, Portugal; 14 pgs.

Texas Instruments, Dipa Rao, "Circular Buffering on TMS320C6000" Application Report; SPRA645A, Apr. 2001; DSP West Applications; 17 pgs.

Zhou, Jingren et al. "Buffering Accesses to Memory-Resident Index Structures" Proceedings of the 29th VLDB Conference, Berlin, Germany, 2003; 12 pgs.

\* cited by examiner

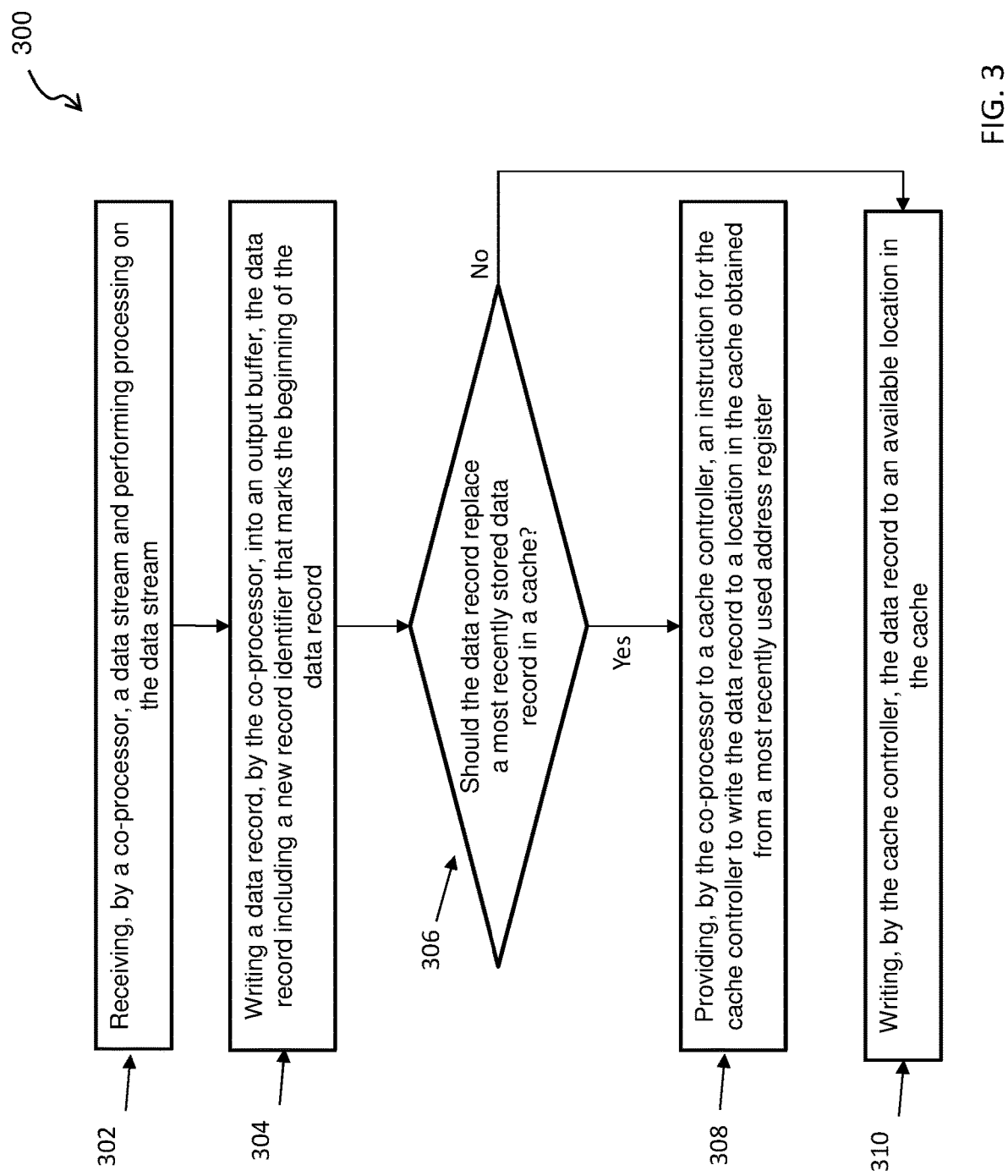

MAINTAINING DATA ORDER BETWEEN BUFFERS

BACKGROUND

The present invention relates generally to systems, methods, and computer program products for controlling the operation of a data buffer and, more specifically, to maintaining data order between an output buffer and a cache.

Processing devices, such as accelerators and co-processors are commonly used to perform specific processing operations, such as sorting and cryptography. The output of these processing devices are written to output buffers. The output buffers are accessed by separate processing devices, such as a cache controller or CPU, to obtain the data in the buffers and to place the data into system memory, such as a cache.

SUMMARY

Embodiments include computer-implemented methods, systems, and computer program products for maintaining data order between an output buffer and a cache. Aspects include receiving, by a co-processor, a data stream and performing processing on the data stream. Aspects also include writing, by the co-processor, a data record into the output buffer. Based on a determination that the data record should replace a most recently stored data record in a cache, aspects include providing, by the co-processor to the cache controller, an instruction for the cache controller to write the data record to a location in the cache obtained from a most recently used address register. Based on a determination that the data record should not replace the most recently stored data record in the cache, aspects include writing, by the cache controller, the data record to an available location in the cache.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of embodiments of the invention are apparent from the following detailed description taken in conjunction with the accompanying drawings in which:

FIG. 3 depicts a flow diagram of a method for maintaining data order between an output buffer and a cache in accordance with an embodiment of the present invention.

Figure 1:
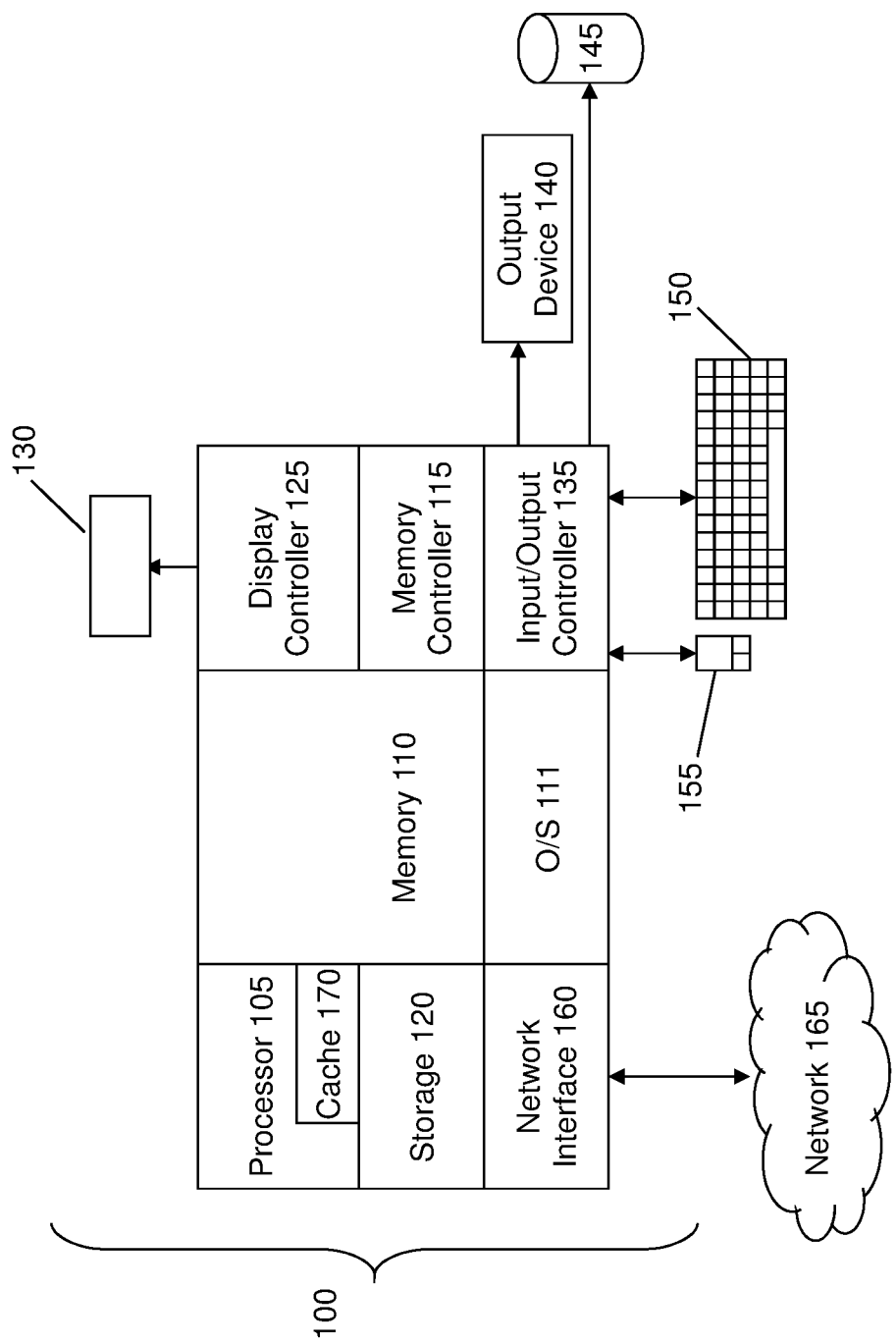
FIG. 1 depicts a block diagram of a processing system in accordance with an embodiment of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments include methods, systems, and computer program products for maintaining data order between an output buffer and a cache. In exemplary embodiments, a co-processor writes data records to an output buffer, which are then obtained by a cache controller and placed into the cache. The co-processor is configured to provide the data records in a desired order to the cache, and in some cases, due to the size of the data records and the co-processor, data records that have previously been written to the cache may violate the desired order.

Accordingly, in exemplary embodiments, the co-processor is configured to create a wrap back signal that is provided to the cache controller when the co-processor determines that a data record in the output buffer should replace the data record most recently saved in the cache. The wrap back signal instructs the cache controller to write the next data record obtained from the output buffer to the address stored in the most recently used address register. In other words, the wrap back signal instructs the cache controller to overwrite the data record most recently written to the cache with the next data record from the output buffer.

Referring now to FIG. 1, a block diagram of a processing system 100 for use in implementing a system or method according to some embodiments is shown. The systems and methods described herein may be implemented in hardware, software (e.g., firmware), or a combination thereof. In some embodiments, the methods described may be implemented, at least in part, in hardware and may be part of the microprocessor of a special or general-purpose computer, such as a personal computer, workstation, minicomputer, or mainframe computer.

In some embodiments, as shown in FIG. 1, the processing system 100 includes a processor 105, a memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors, cameras, microphones and the like. Input devices such as a conventional keyboard 150 and mouse 155 may be coupled to the I/O controller. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor, a semiconductor based microprocessor (in the form of a microchip or chip set), a macroprocessor, or other device for executing instructions. The processor 105 includes a cache 170 that can be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The processing system 100 may further include a display controller 125 coupled to a user interface or display 130. In some embodiments, the display 130 may be an LCD screen. In some embodiments, the processing system 100 may further include a network interface 160 for coupling to a communications network 165. The network 165 may be an IP-based network for communication between the processing system 100 and an external server, client and the like via a broadband connection. In some embodiments, the network 165 may be a managed IP network administered by a service provider. The communications network 165 may be implemented in a wireless fashion, e.g., using wireless protocols and technologies, such as WiFi, WiMax, satellite, etc. The communications network 165 may also be a packet-switched network such as a local area network, wide area network, metropolitan area network, the Internet, or other similar type of network environment. The communications network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in the processing system 100, such as that illustrated in FIG. 1.

Figure 2:
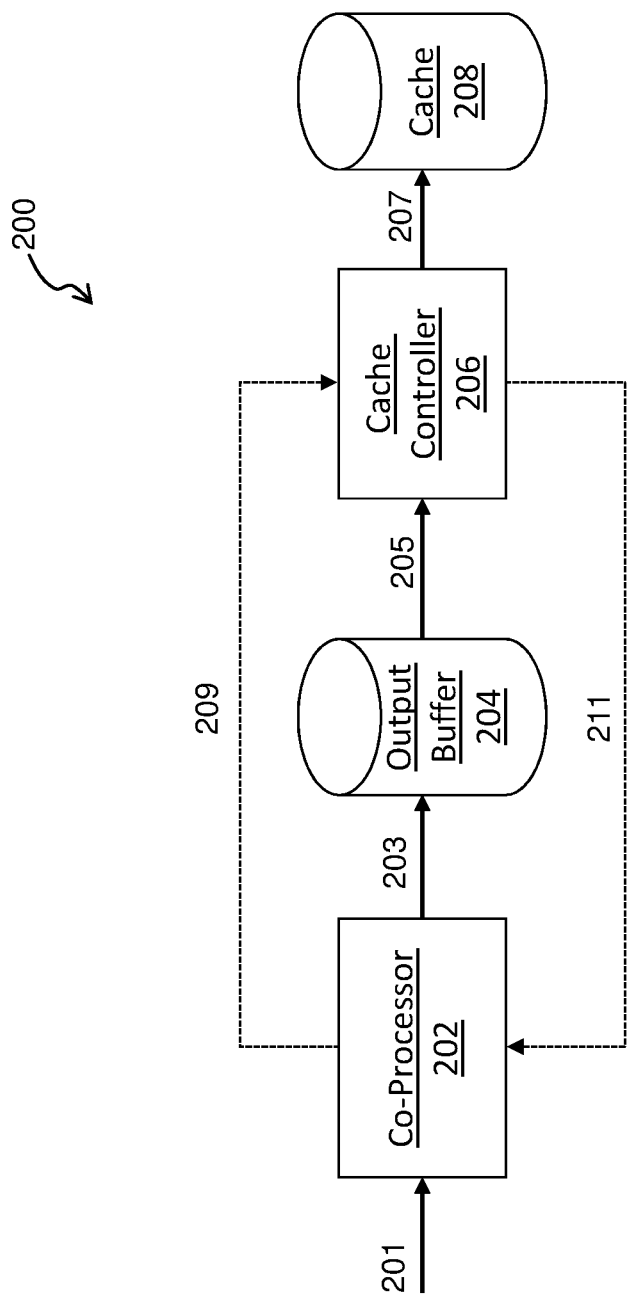
FIG. 2 depicts a block diagram of a system for maintaining data order between an output buffer and a cache in accordance with an embodiment of the present invention.

Referring now to FIG. 2 a block diagram of a system 200 for maintaining data order between an output buffer and a cache in accordance with an embodiment of the present invention is shown. As illustrated, the system 200 includes a co-processor 202, an output buffer 204, a cache controller 206 and a cache 208. In one embodiment, the co-processor 202 is a specialized processing device such as an FPGA, ASIC, or the like, that is configured to receive data stream 201 and to perform a processing operation, such as data-sorting. The co-processor 202 may also be an on-die processing device. In exemplary embodiments, the co-processor 202 is not aware of system memory hierarchy or addressing locations in the system 200 with the exception of the output buffer 204. In exemplary embodiments, the cache controller 206 is aware of system addressing (including address types, translation requirements, and coherency rules). The output buffer 204 is temporary storage between the co-processor 202 and the cache controller 206.

In exemplary embodiments, the co-processor 202 writes data, via communications link 203, to the output buffer, the data includes data records that include both a key and a payload. The data records can be larger in size than the size of the buffer. In exemplary embodiments, the co-processor 202 sorts the data records by a value of the key. The co-processor 202 provides the data records, either full or partial records, to the output buffer 204 based on a defined interface. When the output buffer 204 is full, or the co-processor 202 is finished, the co-processor 202 unit transmits a signal 209 to the cache controller 206. The cache controller 206 is configured to obtain data records via communication link 205, from the output buffer 204 and transfer them, via communications link 207, into the cache 208. In exemplary embodiments, once the cache controller 206 is finished transferring the contents of the output buffer 204 into the cache 208, it transmits a signal 211 the co-processor 202 to inform the co-processor 202.

In exemplary embodiments, a new record indicator is maintained that corresponds to the beginning of each data record in the output buffer 204. The new record indicator can be stored in or adjacent to the output buffer 204. In exemplary embodiments, the cache controller 206 is configured to save, in a register, an address of the most recently saved data record in the cache 208 each time the new record indicator is encountered. This register is referred to herein as a most recently used address register. The most recently used address register is updated by the cache controller 206 each time the cache controller 206 writes a data record to the cache 208 which has a new record indicator.

In exemplary embodiments, the co-processor 202 is configured to create a wrap back signal that is provided to the cache controller 206 when the co-processor 202 determines that a data record in the output buffer 204 should replace the data record most recently saved in the cache 208. The wrap back signal instructs the cache controller 206 to write the next data record obtained from the output buffer 204 to the address stored in the most recently used address register. In other words, the wrap back signal instructs the cache controller 206 to overwrite the data record most recently written to the cache with the next data record from the output buffer 204.

Referring now to FIG. 3 a flow diagram of a method 300 for maintaining data order between an output buffer and a cache in accordance with an embodiment of the present invention is shown. As shown at block 302, the method 300 includes receiving, by a co-processor, a data stream and performing processing on the data stream. Next, at block 304, the method 300 includes writing, by the co-processor, a data record into the output buffer. In exemplary embodiments, the data record includes a new record identifier that marks the beginning of the data record. In one embodiment, the data record includes a key value and the processing performed by the co-processor includes sorting data records in the data stream by their key values. In one embodiment, the data record includes a key value and a payload and the size of the data record is larger than a capacity of the output buffer.

Continuing with reference to FIG. 3, the method 300 includes determining if the data record should replace a most recently stored data record in the cache, as shown at decision block 306. If the data record should replace the most recently stored data record in a cache, the method proceeds to block 308 and includes providing, by the co-processor to the cache controller, an instruction for the cache controller to write the data record to a location in the cache obtained from a most recently used address register. Otherwise, the method 300 proceeds to block 310 and includes writing, by the cache controller, the data record to an available location in the cache. In one embodiment, the determination, by the co-processor, that the data record should replace the most recently stored data record in the cache is based on a determination that a key value of the most recently stored data record violates the desired sorting order.

In exemplary embodiments, the method 300 also includes notifying the co-processor, by the cache controller, that the data record has been stored in the cache from the output buffer. This notification allows the co-processor to track available space in the output buffer.

In one embodiment, the co-processor is configured to write data records to the output buffer, and therefore the cache, in an ascending order based on a key value in each data record. In one example, the co-processor has previously written data records with key values of 121, 123, and 126 to the output buffer and these data records have been written to the cache. The co-processor then writes a data record to the cache with a key value of 125. In this case, if that data record is placed in the cache after the data record with a key value of 125, the desired sorting order will be violated. Accordingly, the co-processor instructs the cache controller to write the data record having the key value of 125 to the location that the last data record was written to, thereby overwriting the data record having a key value of 126 with the data record having a key value of 125.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for maintaining data order between an output buffer and a cache, the method comprising:
    receiving, by a co-processor, a data stream and performing processing on the data stream, wherein the data stream includes a plurality of data records that each includes a key value and wherein the processing performed by the co-processor includes sorting the plurality of data records in the data stream by their key values;
    writing, by the co-processor, a first data record of the data stream into the output buffer, wherein the first data record is determined based on the sorting;
    based on a determination, by the co-processor, that a newly received data record should replace the first data record in a cache, providing, by the co-processor to a cache controller, an instruction for the cache controller to write the newly received data record to a location in the cache obtained from a most recently used address register used by the first data record; and
    based on a determination, by the co-processor, that the newly received data record should not replace the first data record in the cache, writing, by the cache controller, the newly received data record to an available location in the cache.

2. The method of claim 1, wherein the data record includes a new record identifier that marks the beginning of the data record.

3. The method of claim 1, further comprising notifying the co-processor, by the cache controller, that the first data record has been stored in the cache from the output buffer.

4. The method of claim 1, wherein the determination, by the co-processor, that the newly received data record should replace the first data record in the cache is based on a determination that a key value of the first data record violates a desired sorting order.

5. The method of claim 1, wherein a size of the data record is larger than a capacity of the output buffer.

6. The method of claim 1, wherein the co-processor is configured to track available space in the output buffer.

7. A computing system comprising:
    a cache controller configured to control the operation of a cache;
    a co-processor in communication with the cache controller, wherein the co-processor is configured to:
        receive a data stream and performing processing on the data stream, wherein the data stream includes a plurality of data records that each includes a key value and wherein the processing performed by the co-processor includes sorting the plurality of data records in the data stream by their key values;

write a first data record of the data stream into an output buffer, wherein the first data record is determined based on the sorting;

based on a determination that a newly received data record should replace a first data record in a cache, provide an instruction for the cache controller to write the newly received data record to a location in the cache obtained from a most recently used address register used by the first data record; and based on a determination that the newly received data record should not replace the first data record in the cache, provide an instruction for the cache controller to write the newly received data record to an available location in the cache.

8. The computing system of claim 7, wherein the data record includes a new record identifier that marks the beginning of the data record.

9. The computing system of claim 7, wherein the co-processor is further configured to receive a notification from the cache controller that the first data record has been stored in the cache from the output buffer.

10. The method of claim 7, wherein the determination that the data record should replace the first data record in the cache is based on a determination that a key value of the first data record violates a desired sorting order.

11. The computing system of claim 7, wherein a size of the data record is larger than a capacity of the output buffer.

12. The computing system of claim 7, wherein the co-processor is configured to track available space in the output buffer.

13. A computer program product for maintaining data order between an output buffer and a cache comprising:

a non-transitory computer-readable storage medium having program instructions embodied therewith, the program instructions readable by a co-processor system to cause the co-processor to:

receive a data stream and performing processing on the data stream, wherein the data stream includes a plurality of data records that each includes a key value and wherein the processing performed by the co-processor includes sorting the plurality of data records in the data stream by their key values;

write a first data record of the data stream into the output buffer, wherein the first data record is determined based on the sorting;

based on a determination that a newly received data record should replace a first data record in a cache, provide, to a cache controller, an instruction for the cache controller to write the newly received data record to a location in the cache obtained from a most recently used address register used by the first data record; and based on a determination that the newly received data record should not replace the first data record in the cache, instruct the cache controller to write the newly received data record to an available location in the cache.

14. The computer program product of claim 13, wherein the data record includes a new record identifier that marks the beginning of the data record.

15. The computer program product of claim 13, wherein the determination that the data record should replace the first data record in the cache is based on a determination that a key value of the first data record violates a desired sorting order.

16. The computer program product of claim 13, wherein a size of the data record is larger than a capacity of the output buffer.

17. The computer program product of claim 13, wherein the co-processor is configured to track available space in the output buffer.

* * * * *